United States Patent [19]

Ramey et al.

[11] 4,231,837

[45] Nov. 4, 1980

[54] NOTEPAPER DISPENSER AND TAPE TABBER

[75] Inventors: Joseph F. Ramey, West St. Paul; George A. Seiler, St. Paul; Dorman N. Thompson, Jr., St. Croix Beach, all of Minn.

[73] Assignee: Minnesota Mining and Manufacturing Company, St. Paul, Minn.

[21] Appl. No.: 962,059

[22] Filed: Nov. 20, 1978

[51] Int. Cl.[2] .............................................. B32B 31/18

[52] U.S. Cl. .................................... 156/522; 156/530; 156/564; 156/573

[58] Field of Search ............... 156/522, 564, 530, 510, 156/573; 221/30; 222/80

[56] References Cited

U.S. PATENT DOCUMENTS

| | | | |
|---|---|---|---|
| 2,754,023 | 7/1956 | Sheridan | 156/564 |
| 3,033,738 | 5/1962 | Schumacher et al. | 156/530 |
| 3,238,083 | 3/1966 | Snyder | 156/522 |
| 3,539,419 | 11/1970 | Stageberg | 156/540 |
| 3,607,572 | 9/1971 | Jorgensen | 156/522 X |
| 4,003,780 | 1/1977 | Cohn | 156/521 X |

*Primary Examiner*—Michael G. Wityshyn
*Attorney, Agent, or Firm*—Cruzan Alexander; Donald M. Sell; John C. Barnes

[57] ABSTRACT

The dispenser is adapted for dispensing individual sheets of notepaper with a length of tape adhered to the sheets to permit the same to be readily tacked conspicuously to a desired surface. The dispenser supports the stack of notepapers and a roll of pressure-sensitive adhesvie tape. The tape is directed from the roll beneath a support member carrying a severing blade on its forward end which support member is positioned above one end of the stack of notepaper. The support member is movable toward and away from the upper sheet to tack the free end of the tape to the end of the upper sheet of the stack of notepapers.

5 Claims, 10 Drawing Figures

NOTEPAPER DISPENSER AND TAPE TABBER

BACKGROUND OF THE INVENTION

1. Field of the Invention

This invention relates to an improvement in notepaper dispensers wherein, upon the dispensing of the top sheet from a stack of notepaper, a length of pressure-sensitive adhesive tape is applied to each sheet with an extended tape end to permit the sheet to be readily adhered to a desired surface.

2. Description of the Prior Art

The prior art is replete with dispensers for supporting a small stack or package of individual sheets of notepaper which one commonly uses for flagging a document, conveying an instruction or posting a reminder. The art is also replete with various tape dispensing devices wherein the dispenser comprises a mandrel to support a roll of pressure-sensitive adhesive tape and having supported in spaced relation thereto a severing blade such that upon grasping the tape and withdrawing the same from the roll the tape may then be moved against the severing blade and twisted to cut the tape across its width.

The present invention relates to a device wherein the tape is withdrawn from the roll and placed beneath a support member which is movable or biased toward a stack of notepaper. The support member is thus positioned such that it places the free end of the tape into engagement with an end of the notepaper centrally thereof to attach the end of the tape to the upper sheet of the notepaper. The notepaper is disposed in a tray extending normal to the mandrel of a roll of tape and parallel to the direction in which the tape is withdrawn. The operator grasps one sheet of notepaper from the top of the stack and withdraws it from the tray. In doing so he draws the tape from the roll and forms a tab of tape extending beyond the end of the sheet of notepaper. When the desired length for the tab has been withdrawn from the dispenser the operator will then twist the sheet of notepaper sufficiently to cut the tape diagonally across its width by causing the same to engage a cutter disposed adjacent to the support member. The support member will then be placed above the remaining upper sheet in the stack with the free end of the tape disposed below the support member for application to the upper surface of the next sheet.

SUMMARY OF THE INVENTION

This invention relates to a novel notepaper dispenser having means for applying to each sheet of paper as it is taken from the top of the stack a length of pressure-sensitive adhesive tape such that the notepaper may be readily attached to any desired surface adhesively. The dispenser comprises a support member having a tray-like area for supporting a stack of notepaper and a mandrel for supporting a roll of pressure-sensitive adhesive tape on an axis normal to the direction for length of the tray for the notepaper. A support member is positioned above one end of the tray and is movable toward and away from said tray and is adapted to be positioned for engagement with the uppermost sheet of a stack of sheets disposed in said tray. The support member is provided with a cutting blade on one edge thereof such that a length of tape may be severed thereagainst and then a biasing force will move the support member and the free end of the tape into engagement with the succeeding upper sheet in the stack of notepaper. The support member may be normally urged against the sheet by the weight of the member, by a spring or by the operator against the bias of a spring.

DESCRIPTION OF THE DRAWING

The present invention will be described in greater detail with reference to the accompanying drawing wherein.

DETAILED DESCRIPTION OF THE PREFERRED EMBODIMENT AND A MODIFICATION THEREOF

Figure 1:
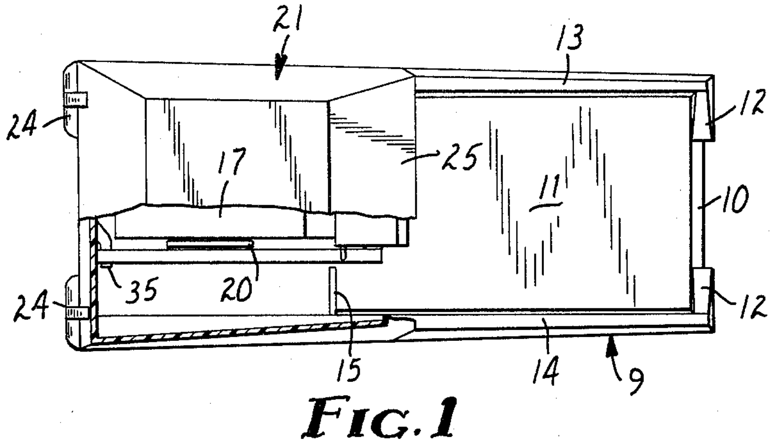
FIG. 1 is a plan view of a notepaper dispenser formed according to the present invention, having a portion thereof broken away to show the interior elements.
Figure 2:
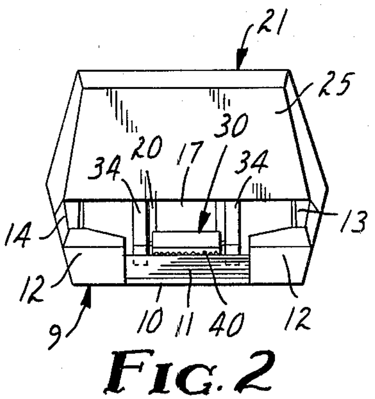
FIG. 2 is a front view of the dispenser.
Figure 3:
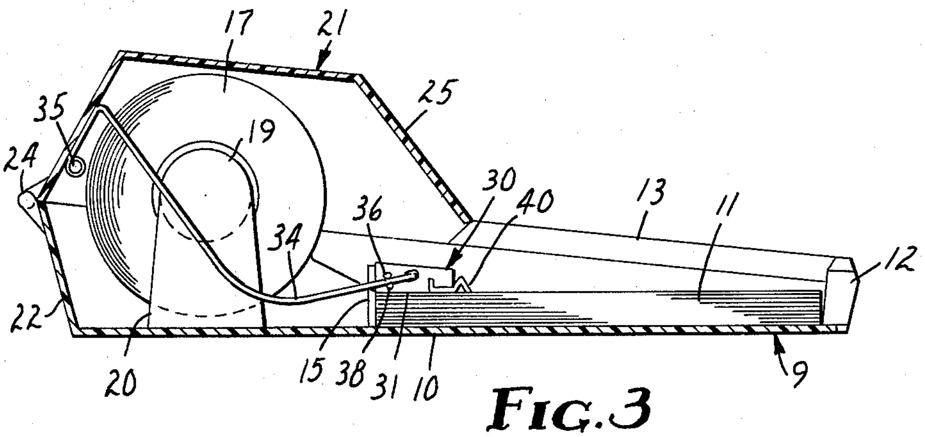
FIG. 3 is a longitudinal sectional view of the dispenser shown in the normal rest position.

Referring now to FIGS. 1 through 5, there is disclosed a notepaper dispensing device comprising a molded plastic support frame 9 having a bottom platen 10, which has means for locating a stack of notepaper 11 including a front wall 12 defined by two ears extending vertically therefrom, opposed transverse side walls 13 and 14, and at the rear end, walls 15. The ears and/or walls define a tray-like receptacle for receiving the stack of notepaper 11.

To the rear of the tray is a compartment for storing a roll of tape 17. The roll of tape 17 is supported by a cylindrical mandrel 19 supported on a vertical post 20 extending upward from the bottom wall 10. A cover 21 is hinged to the rear wall 22 of the support frame 9 as at 24 to afford access to the roll of tape 17. The cover 21 is provided with spring catches or other commonly known latch means between plastic elements to permit the same to be closed over the roll 17 and secured to the lower support frame 9. The front wall of the cover 21 is a forwardly and downwardly slopped wall 25 extending over to the rear edge of the stack of sheets 11. An applicating member is disposed above one end of the stack of sheets 11 and is formed with a lower planar surface to engage the upper sheet of said stack of sheets 11 for applying to said one end of the uppermost sheet in a stack the free end of the tape extending from the roll 17. In the illustrated embodiment of FIGS. 1 through 5, the applicating member comprises a block 30 having a lower planar surface 31 which is normally in engagement with the uppermost sheet in a stack of sheets 11. The block 30 may be biased by its own weight into engagement with the upper sheet or, as illustrated, biased by a spring toward the stack by a pair of flat leaf-spring retaining members 34 which are affixed adjacent one end to the back wall of the cover 21 as indicated for the posts 35. The leaf spring members 34 are pivotally connected at their other end to the block 30 and extend between two spaced pins 36 and 38 to limit the pivotal movement of the block to permit the block to adjust the position of surface 31 with respect to the ends of the springs 34 to engage the surface of the top sheet of the stack 11. The springs 34 extend forwardly between the walls 15 to position the block 30 and tape 17 centrally of the stack of sheets 11.

The applicating member also includes a cutter 40 which is supported on the forward edge of the block 30. The cutter 40 is provided with a serrated cutting edge to sever the tape from the roll 17 as the same is drawn across the cutting blade.

Figure 4:
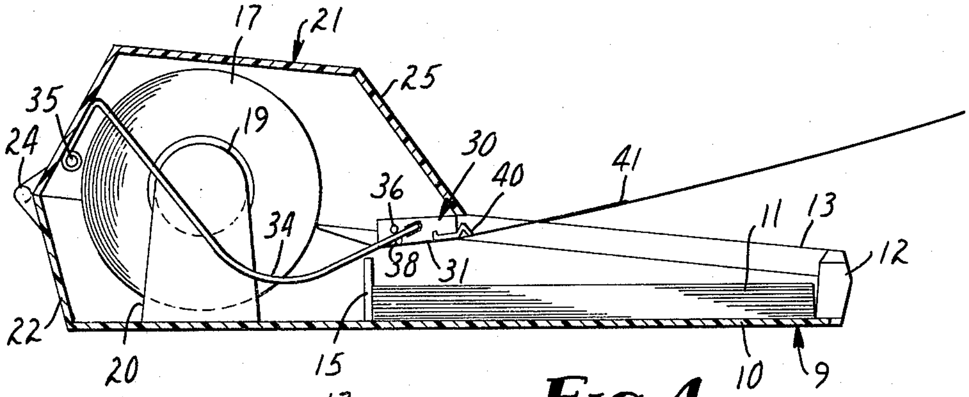
FIG. 4 is a longitudinal sectional view similar to that of FIG. 3 showing a sheet of notepaper and a length of tape being withdrawn from the dispenser.
Figure 5:
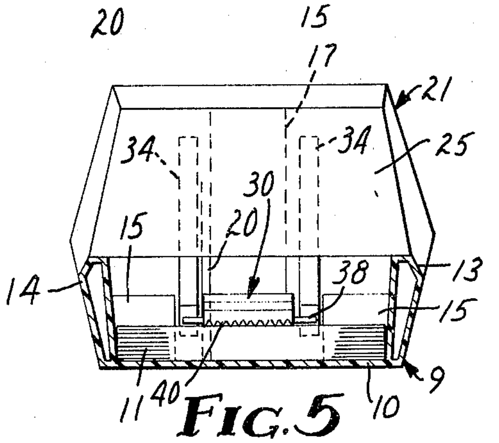
FIG. 5 is a transverse sectional view through the notepaper tray.

To describe the operation of the notepaper dispenser it will be seen that the tape from the roll 17 has the free end 41 thereof withdrawn from the roll and placed under the applicating member 30, the same being drawn between the walls 15. The adhesive coated surface of the tape is then placed into contact with the upper sheet in the stack of sheets 11. The upper sheet may be withdrawn from the stack as shown in FIG. 4 and as the same is withdrawn the tape is pulled from the roll 17, lifting the block 30 of the applicating member upward against the lower edge of the front wall 25 of the cover. After a length of tape, of the length desired, is withdrawn with the note sheet, the sheet is twisted and an edge of the tape is brought into engagement with the cutting edge of the cutter 40 to sever the tape. After the tape is severed, the applicating member then is biased into engagement with the next sheet in the stack, applying the free edge of the tape to the end of the top sheet of paper. The sheets may thus be withdrawn successively, each having a length of tape adhered thereto.

A second embodiment of the present invention is disclosed in FIGS. 6 through 10. This embodiment is also provided with a molded plastic support frame 39 having a platen 47, a front wall or ears 48, opposed transverse side walls or ears 42 and 44, and the rear edge is formed by upright supports 45, defining a tray-like receptacle for a stack of notepaper 46.

The cover or tape tray 50 is positioned above the support member 39 at the rear end thereof. This tray 50 is pivotally mounted on transversely spaced posts 51 positioned above a rear wall 52 of the support member 39. The posts 51 have ends extending through openings in a bottom planar wall 54 of the tray 50. The forward end of the tray 50 has a pair of openings 55 which receive therethrough the upper ends of the supports 45. The supports 45 may be biased inwardly by external pressure being applied against pins 56 extending outward from the upper ends of the supports 45 to move shouldered portions 58 of the supports out of engagement with lips on the support 54 between the openings and side walls 60 such that the wall 54 can be raised. The pins 56 extend through slotted openings in the side walls 60 of the cover 50. A vertically positioned cylindrical mandrel 64 supports a roll of tape 65 on the wall 54. Tape is withdrawn from the roll 65 around a conical roller 66 supported on a block 67 in the cover 50. From the roller 66 the tape is drawn between two spaced tape guides 68 and 69 which have inclined tape engaging surfaces and which maintain the pressure-sensitive adhesive tape in a longitudinal bowed or curved configuration such that the tape will be self-supporting from the guide members 68 and 69 to a position under the lower planar surface of an applicating member supported at the forward end of the cover 50. The applicating member will apply the leading edge of the tape against the uppermost sheet in the stack of sheets 46.

Figure 6:
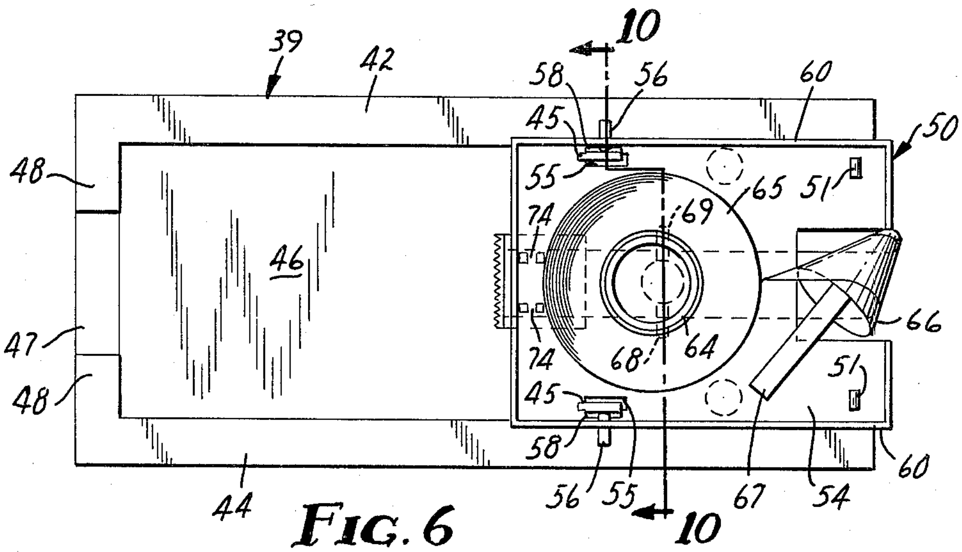
FIG. 6 is a plan view of a second embodiment of the dispenser of the present invention.
Figure 7:
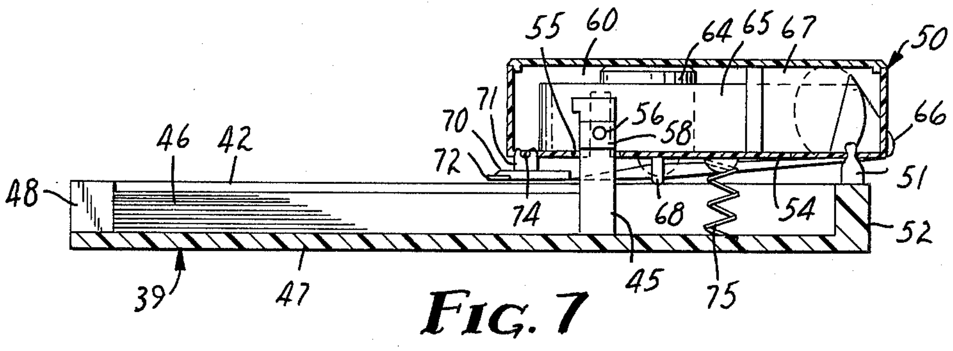
FIG. 7 is a longitudinal sectional view of the dispenser shown in FIG. 6.
Figure 8:
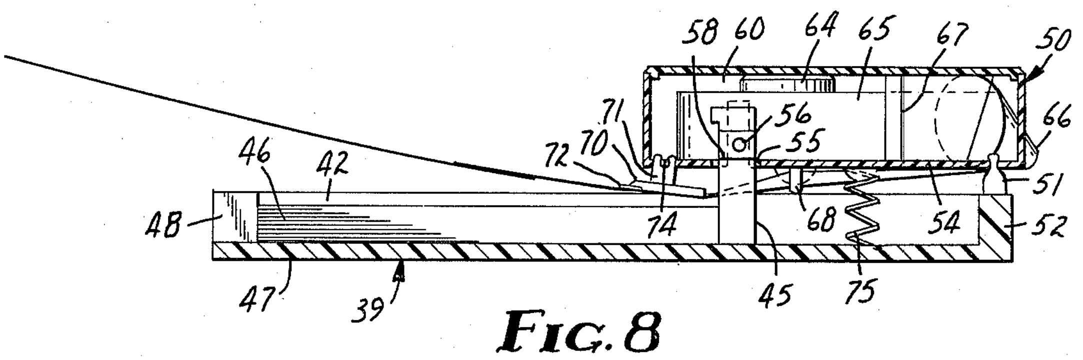
FIG. 8 is a longitudinal sectional view corresponding to FIG. 7 and disclosing the dispenser in the operating mode.
Figure 9:
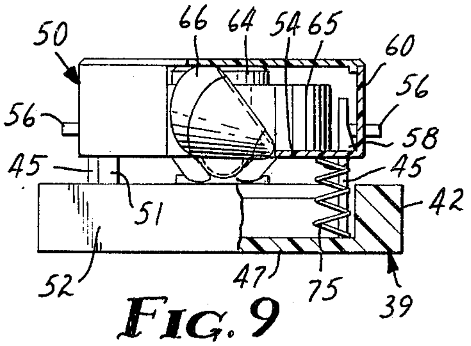
FIG. 9 is a rear view of the dispenser of FIG. 6 with portions broken away to show interior portions.
Figure 10:
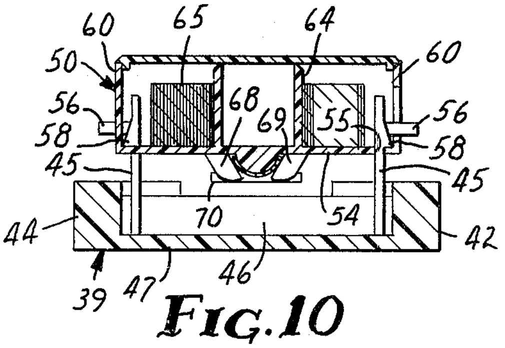
FIG. 10 is a transverse sectional view through the dispenser of FIG. 6 taken along line 10—10.

In the illustrated embodiment of FIGS. 6 through 10 the applicating member is pivotally supported on the cover 50. The applicating member comprises a plate-like member 70 having a pair of upstanding ears 71 which are bifurcated at their upper ends to extend through spaced openings in the bottom wall 54 of the cover 50 and to rock on intermediate strips 74. The amount of pivotal movement being limited by the ears 71 and said openings as best seen in FIGS. 6 and 8. The plate 70 has a cutting edge formed thereon or a severing member 72 at the forward edge thereof.

A pair of transversely spaced spring members 75 are supported between the lower wall of the support member 39 and the lower wall 54 of the cover 50. The springs 75 are located between the pivot posts 51 and the latch supports 45 and bias the forward edge of the cover 50 upwardly from the stack of sheets and against the shouldered portions on the supports 45.

In operation, the cover 50 may be pressed downwardly against the bias of the springs 75 and the applicating member will press the free end of the tape 65 against the upper sheet of notepaper. The sheet of paper is then raised and withdrawn and the tape is dispensed from the roll by being secured to the paper. When the desired length of tape to form a tab is withdrawn the paper is twisted to cut the tape edgewise across the severing member 72. The free end of the tape is then suspended between the applicating member and the stack of paper 46.

If it is desired to remove a sheet of notepaper without the tape tab, the upper sheet can be so removed from the top of the stack. If it is desired to dispense a length of tape, the pins 56 are forced toward each other and the springs 75 raise the cover 50. This permits access to the free end of the tape. It can then be withdrawn and severed at the cutting member or edge 72. The cover can again be locked in the normal position by lowering the cover and plate 54 again until the shouldered portions 58 of the supports 45 engage the plate 54.

Having thus described several embodiments of the present invention, it will be appreciated other changes can be made without departing from the present invention as defined by the appended claims.

We claim:

1. A notepaper dispenser comprising a frame having a support surface for a stack of sheets with one end in register, means for rotatably supporting a roll of pressure-sensitive adhesive tape, an applicating member having a planar surface positioned on said frame above said sheets and adjacent said one end of said sheets, means supporting said applicating member for movement toward and away from the upper sheet of a said stack of sheets on said support surface for applying the free end of a said roll of tape successively to a said upper sheet, said support surface having a length and width substantially greater than the size of said applicating member and the width of said tape, and cutting means for cutting a length of tape, said cutting means being positioned on said applicating member adjacent an edge of said planar surface, which edge is spaced along the path of said tape from said means for supporting said roll of tape beyond said planar surface.

2. A notepaper dispenser according to claim 1 wherein means are provided for biasing said means supporting said applicating member toward said support surface to place the free end of the tape in contact with the stack of sheets.

3. A notepaper dispenser according to claim 1 wherein said means supporting said applicating member include pivoted support means affording manual movement of said applicating member toward said support surface to permit selective application of said free end of the tape to the upper sheet of a said stack of sheets, and spring means for normally maintaining said pivoted support means and said applicating member in spaced relationship to said stack of sheets.

4. A notepaper dispenser according to claim 3 wherein said dispenser comprises guide means for said tape, positioned between said means for rotatably supporting said tape and said cutting means for placing a transverse bow in said tape to support the free end of the tape beneath said applicating member and above a said stack of sheets on said support surface.

5. A notepaper dispenser according to claims 2 or 3 wherein said applicating member is pivotally mounted on an axis transverse to said support surface to afford alignment of said planar surface of said applicating member with said sheets in a said stack of sheets and said support surface.

* * * * *